United States Patent
Russell et al.

(10) Patent No.: US 10,793,454 B1
(45) Date of Patent: Oct. 6, 2020

(54) WATER TREATMENT SYSTEM WITH ULTRAVIOLET LEDS AND PHOTO-CATALYSTS

(71) Applicant: Government of the United States, as represented by the Secretary of the Air Force, Wright-Patterson AFB, OH (US)

(72) Inventors: Morgan Russell, Dayton, OH (US); John Stubbs, Xenia, OH (US); David Kempisty, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 148 days.

(21) Appl. No.: 15/902,003

(22) Filed: Feb. 22, 2018

(51) Int. Cl.
    *C02F 1/72* (2006.01)
    *C02F 1/32* (2006.01)
    (Continued)

(52) U.S. Cl.
    CPC ............ *C02F 1/725* (2013.01); *B01J 21/063* (2013.01); *B01J 35/004* (2013.01); *B01J 35/02* (2013.01);
    (Continued)

(58) Field of Classification Search
    CPC .. C02F 1/32; C02F 1/325; C02F 1/725; C02F 2305/10; C02F 2303/04; C02F 2201/3222;
    (Continued)

(56) References Cited

U.S. PATENT DOCUMENTS

| 4,255,383 A | 3/1981 | Schneck |
| 5,780,860 A | 7/1998 | Gadgil et al. |

(Continued)

FOREIGN PATENT DOCUMENTS

| CN | 101062800 A | 10/2007 |
| CN | 101703924 B | 1/2012 |

(Continued)

OTHER PUBLICATIONS

Chen, D., et al., Mesoporous anatase TiO2 beads with high surface areas and controllable pore sizes: A superior aandidate for high-performance dye-sensitized solar cells. Advanced Materials, 2009, 21(21), pp. 2206-2210.

(Continued)

*Primary Examiner* — Lessanework Seifu
(74) *Attorney, Agent, or Firm* — AFMCLO/JAZ; Jeffrey Moore

(57) ABSTRACT

A reactor system for treating contaminated water is disclosed. The reactor system includes a reactor vessel having first and second end portions and an internal reactor volume defined by interior surfaces of the reactor vessel. A fluoropolymer coating is applied over at least a portion of the interior surfaces of the reactor vessel. The reactor system also includes a water inlet disposed in the first end portion and a water outlet disposed in the second end portion. At least one ultraviolet light-emitting diode (LED) is included and disposed so as to project ultraviolet light into the reactor vessel. A plurality of photo-catalyst substrates are also disposed within the internal reactor volume of the reactor vessel. Each of these substrates includes a coating of titanium dioxide applied to an outer surface of a substrate. A method for remediating contaminated water is also disclosed.

3 Claims, 3 Drawing Sheets

(51) Int. Cl.
*B01J 21/06* (2006.01)
*B01J 35/00* (2006.01)
*B01J 35/02* (2006.01)
*B01J 37/02* (2006.01)

(52) U.S. Cl.
CPC ....... *B01J 37/0217* (2013.01); *B01J 37/0225* (2013.01); *C02F 1/32* (2013.01); *C02F 2201/3222* (2013.01); *C02F 2201/3227* (2013.01); *C02F 2201/3228* (2013.01); *C02F 2303/04* (2013.01); *C02F 2305/10* (2013.01)

(58) Field of Classification Search
CPC ...... C02F 2201/3227; C02F 2201/3228; B01J 35/004; B01J 35/02; B01J 19/123
See application file for complete search history.

(56) References Cited

U.S. PATENT DOCUMENTS

| | | | |
|---|---|---|---|
| 5,790,934 | A | 8/1998 | Say et al. |
| 5,853,572 | A | 12/1998 | Kuennen et al. |
| 5,997,812 | A | 12/1999 | Burnham et al. |
| 6,063,343 | A | 5/2000 | Say et al. |
| 6,118,134 | A | 9/2000 | Justak |
| 6,555,011 | B1 | 4/2003 | Tribelsky et al. |
| 6,716,343 | B2 | 4/2004 | Kool et al. |
| 6,803,077 | B2 | 10/2004 | Yu |
| 6,902,653 | B2 * | 6/2005 | Carmignani ............ A61L 2/088 210/748.11 |
| 7,002,161 | B2 | 2/2006 | Greene |
| 7,304,312 | B2 | 12/2007 | Hopaluk et al. |
| 7,429,546 | B2 | 9/2008 | Iwahashi et al. |
| 7,931,859 | B2 | 4/2011 | Mlodzinski et al. |
| 8,226,831 | B2 | 7/2012 | Maiden |
| 8,816,300 | B1 | 8/2014 | Walker et al. |
| 8,840,845 | B2 | 9/2014 | Soler et al. |
| 8,912,500 | B1 | 12/2014 | de Vries |
| 9,540,252 | B1 * | 1/2017 | Collins .................. C02F 1/325 |
| 2005/0191505 | A1 | 9/2005 | Akarsu et al. |
| 2010/0237254 | A1 | 9/2010 | Mason et al. |
| 2013/0123092 | A1 | 5/2013 | Miyasaka et al. |
| 2013/0146783 | A1 | 6/2013 | Boodaghians et al. |
| 2014/0271353 | A1 | 9/2014 | Oestergaard et al. |

FOREIGN PATENT DOCUMENTS

| | | |
|---|---|---|
| CN | 202717604 U | 2/2013 |
| CN | 103272588 A | 9/2013 |
| CN | 104250057 A | 12/2014 |
| CN | 104587994 A | 5/2015 |
| CN | 105170132 A | 12/2015 |
| JP | 2012254425 A | 12/2012 |
| MX | 2014012388 A | 4/2016 |
| WO | 2010071814 A1 | 6/2010 |

OTHER PUBLICATIONS

Fujishima, A, et al., Titanium dioxide photocatalysis. Journal of Photochemistry and Photobiology C: Photochemistry Reviews, 2000, 1(1), pp. 1-21.
Thakur, "Efficient Detection of UV light by Quantum Dots Sensitized Silicon Detector", A Thesis in Electrical Engineering (Year: 2014).
United States Environmental Protection Agency, Ultraviolet Disinfection Guidance Manual for the Final Long Term 2 Enhanced Surface Water Treatment Rule, Office of Water, Nov. 2006.
Han, Changseok, et al., Innovative visible light-activated sulfur doped TiO2 films for water treatment, Applied Catalyst B: Environmental 107, 2011, pp. 77-87.
Swarnakar, Prakash, et al., Silver deposited titanium dioxide thin film for photocatalysis of organic compounds using natural light, Solar Energy 88, 2013, pp. 242-249.
Adamek E., et al., Assessment of radiant flux absorption by irradiated phase on the kinetics of photocatalytic reactions. Physicochem. Probl. Miner. Process., 2010, 45, pp. 5-14.
Chen, D., et al., Mesoporous anatase TiO2 beads with high surface areas and controllable pore sizes: A superior candidate for high-performance dye-sensitized solar cells. Advanced Materials, 2009, 21(21), pp. 2206-2210.
Chen, S., et al., Study on the photocatalytic oxidation of NO2- ions using TiO2 beads as a photocatalyst. Desalination, 2006, 194(1-3), pp. 127-134.
Daneshvar, N., et al., Immobilization of TiO2 nanopowder on glass beads for the photocatalytic decolorization of an azo dye C.I. Direct Red 23. Journal of Environmental Science and Health. Part A, Toxic/hazardous Substances & Environmental Engineering, 2005, 40(8), pp. 1605-1617.
Fabiyi, M., et al., Photocatalytic mineralisation of methylene blue using buoyant TiO2-coated polystyrene beads. Journal of Photochemistry and Photobiology A: Chemistry, 2000, 132(1-2), pp. 121-128.
Sauvage, Frederic, et al., Dye-Sensitized Solar Cells Employing a Single Film of Mesoporous TiO2 Beads Achieve Power Conversion Efficiencies Over 10%. ACS Nano, 2010, 4(Aug. 2016), pp. 4420-4425.
Fukishima, A., et al., Titanium dioxide photocatalysis. Journal of Photochemistry and Photobiology C: Photochemistry Reviews, 2000, 1(1), pp. 1-21.
Gupta, S.M, et al., A review of TiO2 nanoparticles. Chinese Science Bulletin, 2011, 56(16), pp. 1639-1657.
KE, C.R., et al., Photoanodes consisting of mesoporous anatase TiO 2 beads with various sizes for high-efficiency flexible dye-sensitized solar cells. Journal of Physical Chemistry C, 2012, 116(3), pp. 2600-2607.
Kim, S.C., et al., Preparation of TiO2-coated hollow glass beads and their application to the control of algal growth in eutrophic water. Microchemical Journal, 2005, 80(2), pp. 227-232.
Lee, K.M., et al., Recent developments of zinc oxide based photocatalyst in water treatment technology: A review. Water Research, 2016, (vol. 88). Elsevier Ltd.
Li, D., et al., A novel double-cylindrical-shell photoreactor immobilized with monolayer TiO2-coated silica gel beads for photocatalytic degradation of Rhodamine B and Methyl Orange in aqueous solution. Separation and Purification Technology, 2014, 123, pp. 130-138.
Mahlambi, M.M, et al., Recent Developments in Environmental Photocatalytic Degradation of Organic Pollutants: The Case of Titanium Dioxide Nanoparticles—A Review. Journal of Nanomaterials, 2015, vol. 201(Article ID 790173), pp. 1-29.
Medina-Valtierra, J., et al., The influence of surfactants on the roughness of titania sol-gel films. Materials Characterization, 2007, 58(3), pp. 233-242.
Natarajan, K., et al., Photocatalytic reactor based on UV-LED/TiO2 coated quartz tube for degradation of dyes. Chemical Engineering Journal, 2011, 178, pp. 40-49.
Serpone, Nick, et al., Photocatalysis over TiO2 supported on a glass substrate. Solar Energy Materials, 1986, 14, pp. 121-127.
Rasoulifard, M., et al., Kinetic study for photocatalytic degradation of Direct Red 23 in UV-LED/nano-TiO2/S2O82—process: Dependence of degradation kinetic on operational parameters. Journal of Industrial and Engineering Chemistry, 2014, 20(5), pp. 3695-3702.
Sakthivel, S., et al., Solar photocatalytic degradation of azo dye: comparison of photocatalytic efficiency of ZnO and TiO2. Solar Energy Materials and Solar Cells, 2003, 77(1), pp. 65-82.
Sakthivel, S., et al., Photocatalytic decomposition of leather dye. Journal of Photochemistry and Photobiology A: Chemistry, 2002, 148, pp. 153-159.
Shargh, M., et al., A high-efficient batch-recirculated photoreactor packed with immobilized TiO2-P25 nanoparticles onto glass beads for photocatalytic degradation of phenazopyridine as a pharmaceutical contaminant: artificial neural network modeling. Water Science and Technology, 2016, 73(11), pp. 2804-2814.
Shifu, C., et al., The effect of different preparation conditions on the photocatalytic activity of TiO2-SiO2/beads. Surface and Coatings Technology, 2006, 200(11), pp. 3637-3643.

(56) References Cited

OTHER PUBLICATIONS

Varshney, G., et al., Nanoscale TiO2 films and their application in remediation of organic pollutants. Coordination Chemistry Reviews, 2016, 306(July), pp. 43-64.

* cited by examiner

WATER TREATMENT SYSTEM WITH ULTRAVIOLET LEDS AND PHOTO-CATALYSTS

GOVERNMENT INTEREST

The invention described herein may be manufactured, used, and licensed by or for the Government of the United States for all governmental purposes without the payment of any royalty.

FIELD OF THE INVENTION

The present invention relates to systems for water remediation, and more particularly to systems for water remediation using ultraviolet light.

BACKGROUND OF THE INVENTION

Maintaining the integrity of limited water resources is of upmost importance. Novel treatment measures are needed to address the removal of contaminants of concern or "CoCs", including both long established CoCs (such as chlorinated solvents, fuels, and microorganisms) and emerging CoCs (such as pharmaceuticals and personal care products, per-fluorinated compounds, and endocrine disrupting substances). Drinking water aquifers are among many limited natural resources that may be impacted by industrial operations, military activities, and accidental spills. For instance, groundwater contamination has been reported from rocket fuel, weapons range operations, and the use of specific chemicals to facilitate firefighting activities. Moreover, these CoC compounds are known to move through groundwater and can potentially contaminate drinking water sources. Past groundwater cleanup techniques, such as pump and treat technologies, have been found to be costly, ineffective, and take years or possibly decades to completely remediate.

It is therefore desirable to provide more efficient techniques for the degradation of organic and biological CoCs in aqueous sources.

In particular, it is desirable to provide a more environmentally friendly method of degrading organic contaminants. Preferably, the new remediation method should avoid the use of heavy metals, such as mercury, and thus provide no risk of further environmental contamination with such heavy metals. Moreover, the new remediation method should preferably pose little to no contamination risk due to leached catalysts. Ideally, the new remediation method would provide for reduced catalyst and energy consumption as well and offer increased portability.

SUMMARY OF THE INVENTION

In a first aspect, the present disclosure provides a reactor system for treating contaminated water. According to one embodiment of the present disclosure, the reactor system includes a reactor vessel having first and second end portions and an internal reactor volume defined by interior surfaces of the reactor vessel. A fluoropolymer coating is applied over at least a portion of the interior surfaces of the reactor vessel. The reactor system also includes a water inlet disposed in the first end portion and a water outlet disposed in the second end portion. At least one ultraviolet light-emitting diode (LED) is included and disposed so as to project ultraviolet light into the reactor vessel. A plurality of photo-catalyst substrates are also disposed within the internal reactor volume of the reactor vessel. Each of these substrates includes a coating of titanium dioxide applied to an outer surface of a substrate.

In certain embodiments of the present disclosure, the fluoropolymer coating is preferably made of polytetrafluoroethylene (PTFE).

In some embodiments of the present disclosure, each of the photo-catalyst substrates is preferably made of a borosilicate or quartz material.

In certain embodiments of the present disclosure, the coating of titanium dioxide is preferably composed of titanium dioxide in anatase crystalline form. Further, in certain embodiments of the present disclosure, the outer surface of the substrate is preferably coated with titanium dioxide in an amount from about 0.02 mg/cm' to about 0.20 mg/cm'.

In certain embodiments of the present disclosure, water within the internal reactor volume is preferably subjected to ultraviolet radiation from the at least one ultraviolet LED at a fluence rate of at least 0.03 Joules per liter per second. In some instances, the fluence rate may be from about 0.03 Joules per liter per second to about 0.13 Joules per liter per second.

In various embodiments of the present disclosure, water in the internal reactor volume preferably has an average residence time from about 20 minutes to about 55 minutes.

In some embodiments of the present disclosure, the at least one ultraviolet LED preferably emits ultraviolet light having a wavelength from about 240 nm to about 390 nm.

In a second aspect, the present disclosure provides a method for remediating contaminated water. According to one embodiment of the present disclosure, the method includes a first step of providing a remediation reactor system. This remediation reactor system includes a reactor vessel having first and second end portions and an internal reactor volume defined by interior surfaces of the reactor vessel. A fluoropolymer coating is applied over at least a portion of the interior surfaces of the reactor vessel. The reactor system also includes a water inlet disposed in the first end portion and a water outlet disposed in the second end portion. At least one ultraviolet light-emitting diode (LED) is included and disposed so as to project ultraviolet light into the reactor vessel. A plurality of photo-catalyst substrates are also disposed within the internal reactor volume of the reactor vessel. Each of these substrates includes a coating of titanium dioxide applied to an outer surface of the substrate.

According to the method, water which includes organic and/or biological contaminants is introduced into the internal reactor volume through the water inlet. The contaminated water within the internal reactor volume is then subjected to ultraviolet radiation from at least one ultraviolet LED so as to destroy at least a portion of the organic and/or biological contaminants and provide a remediated water. The remediated water is then removed from the internal reactor volume.

In certain embodiments of the present disclosure, the portion of the contaminants destroyed preferably includes at least one contaminant selected from the group consisting of bacteria, protozoa, herbicides, insecticides, pharmaceuticals, personal care products, fuels, solvents, food additives, ammunition propellants, explosives and combinations thereof. More particularly, in certain embodiments of the present disclosure, the portion of the contaminants destroyed preferably includes at least one contaminant selected from the group consisting coliform bacteria and *Giardia* protozoa.

In certain embodiments of the present disclosure, water in the internal reactor volume preferably has an average residence time from about 20 minutes to about 55 minutes.

In some embodiments of the present disclosure, at least 50% of the contaminants are preferably destroyed by the ultraviolet radiation within the internal reactor volume.

In certain embodiments of the present disclosure, the remediated water removed from the internal reactor volume is preferably potable.

In some embodiments of the present disclosure, a plurality of remediation reactor systems are preferably provided and the steps of introducing contaminated water, subjecting the water to ultraviolet radiation, and then removing the water are carried out in each of the remediation reactor systems.

In certain embodiments of the present disclosure, the fluoropolymer coating is preferably made of polytetrafluoroethylene.

In some embodiments of the present disclosure, each of the photo-catalyst substrates is preferably made of a borosilicate or quartz material. More particularly, in certain embodiments of the present disclosure, each of the photo-catalyst substrates is preferably made up of a borosilicate bead, a quartz cylinder, or a borosilicate microscope slide.

In certain embodiments of the present disclosure, the coating of titanium dioxide is preferably made of titanium dioxide in anatase crystalline form. Further, in certain embodiments of the present disclosure, the outer surface of the substrate is preferably coated with titanium dioxide in an amount from about 0.02 mg/cm$^2$ to about 0.20 mg/cm$^2$.

In certain embodiments of the present disclosure, water within the internal reactor volume is preferably subjected to ultraviolet radiation from the at least one ultraviolet LED at a fluence rate of at least 0.03 Joules per liter per second. In some instances, the fluence rate may be from about 0.03 Joules per liter per second to about 0.13 Joules per liter per second.

In some embodiments of the present disclosure, the at least one ultraviolet LED preferably emits ultraviolet light having a wavelength from about 240 nm to about 390 nm.

In a third aspect, the present disclosure provide a reactor system for treating contaminated water. According to one embodiment, the reactor system includes a reactor vessel having a first and second end portions and an internal reactor volume defined by interior surfaces of the reactor vessel. A polytetrafluoroethylene coating applied over at least a portion of the interior surfaces of the reactor vessel. A water inlet disposed in the first end portion and a water outlet disposed in the second end portion. The reactor system also includes a pump in fluid flow communication with the water inlet. The reactor system also includes at least one ultraviolet light-emitting diode (LED) disposed so as to project ultraviolet light into the reactor vessel. In addition, the reactor system also includes a plurality of photo-catalyst substrates disposed within the internal reactor volume of the reactor vessel, each of the substrates having a coating of titanium dioxide applied to an outer surface of the substrate.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

In response to the water remediation needs noted above, the present disclosure provides, in a first aspect, a new reactor system for treating contaminated water.

Figure 1:
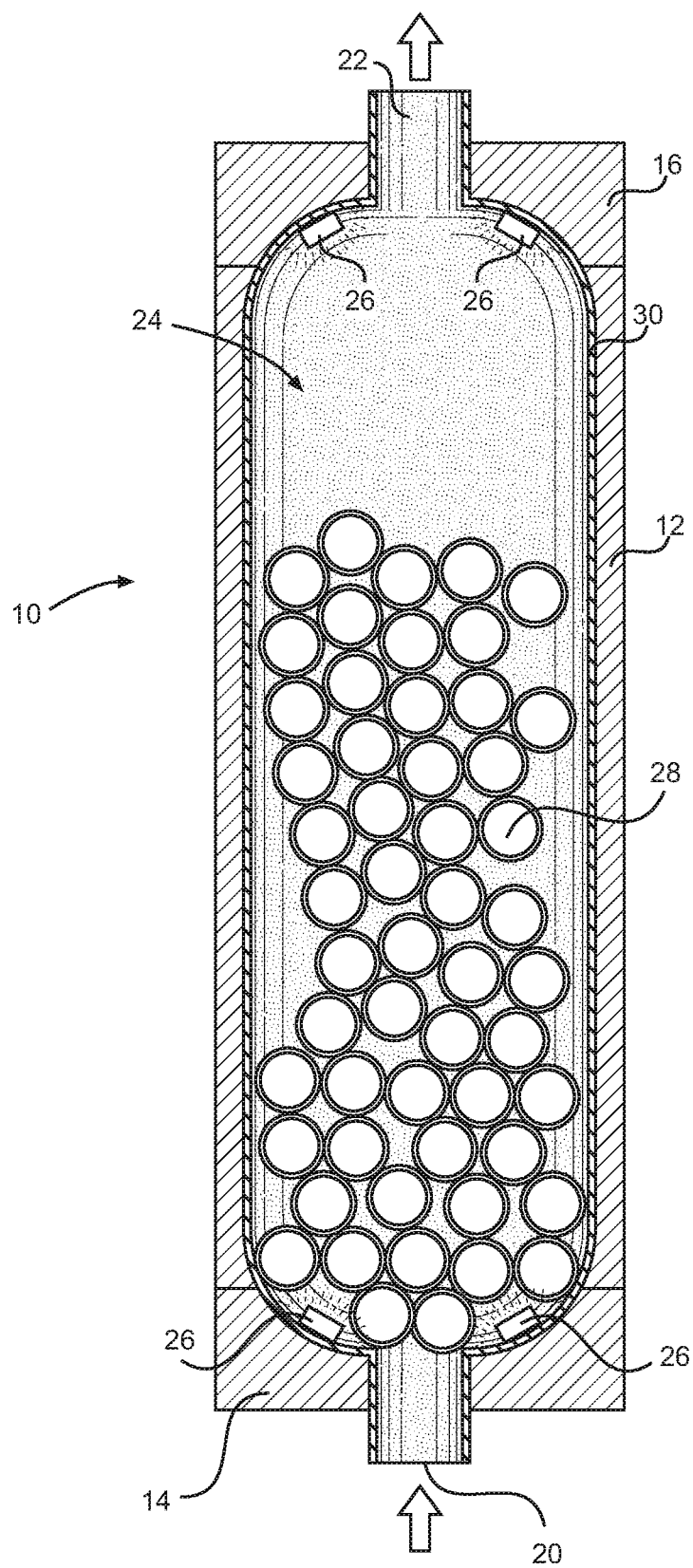
FIG. 1. is a cross-sectional view of a reactor according to one embodiment of the present disclosure.

This reactor system includes a reactor vessel 10. As shown in FIG. 1, this reactor vessel 10 generally includes a central portion 12 disposed between a first end portion 14 and a second end portion 16. The central portion 12 of the reactor vessel 10 is generally cylindrical, having a circular or elliptical cross-section. In general, the central portion 12 of the reactor vessel 10 has an elongate shape, that is, the central portion 12 has a diameter and a length where the length is greater than the diameter. This elongate shape allows for a more controlled (i.e., a more laminar) flow of water through the reactor vessel 10, which is believed to allow for more effective destruction of contaminants within the reactor vessel 10.

The central portion 12 of the reactor vessel 10 is capped on either end by the first and second end portions 14, 16. These end portions may be provided by, for instance, a pair of end caps which may be screwed, welded, or otherwise secured to the central portion 12 of the reactor vessel 10. The first and second end portions 14, 16 may in some instances simply be substantially flat end caps. In other embodiments of the disclosure, however, the end portions 14, 16 may have a concave or hemispherical internal shape.

The reactor system also includes a water inlet 20 disposed in the first end portion 14 and a water outlet 22 disposed in the second end portion 16.

The reactor vessel 10 has an internal reactor volume 24 which is defined by the internal surfaces of the reactor vessel 10, i.e., by the interior surfaces of the central portion 12 and the end portions 14, 16 of the reactor. The overall size of the reactor vessel 10 may vary depending up the flow rate of water to be treated within the reactor vessel 10. In some instances, according to the present disclosure, the reactor vessel 10 may have an internal volume 24 from about 35 cm$^3$ to about 40 cm$^3$. In this regard, the diameter of the reactor vessel 10 central portion 12 may in some instances range from about 2 cm to about 3 cm and the length of the central portion 12 may in some instances be up to about 8 cm.

In some embodiments, the reactor vessel 10 may be fabricated from a metal such as steel. In other instances, however, it may be preferable to provide the reactor vessel 10 from a polymeric material such as polyvinyl chloride (PVC) or polytetrafluoroethylene (PTFE).

According to the present disclosure, a fluoropolymer coating 30 is applied over at least a portion of the interior surfaces of the reactor vessel 10. More preferably, a fluoropolymer coating 30 is applied over all of the interior surfaces of the reactor vessel 10. In certain embodiments of the present disclosure, this fluoropolymer coating 30 preferably includes polytetrafluoroethylene (PTFE). More preferably, this is made up entirely of PTFE.

The thickness of the fluoropolymer coating 30 may vary, but typically the fluoropolymer coating 30 has an average coating thickness ranging from about 1/32 inch to about 1/4 inch.

As discussed in greater detail below, the fluoropolymer coating 30 is highly reflective of light energy, particularly ultraviolet (UV) light energy. Thus, the coating 30 insures that a larger portion of the UV light emitted within the reactor vessel 10 is reflected into the water being treated, rather than being absorbed by the interior surfaces of the reactor vessel 10.

The reactor system also includes at least one, and preferably a plurality, of ultraviolet light-emitting diodes (LEDs) 26. These LEDs 26 are typically positioned along the interior surfaces of the reactor vessel 10, and are disposed to project ultraviolet light into the reactor vessel 10. In certain preferred embodiments of the disclosure, LEDs 26 are attached to the internal surfaces of one or both of the end portions 12, 14. The total number of LEDs 26 within the reactor vessel 10 may vary, depending upon the size of the reactor vessel 10 and the expected flow rate of water through the reactor vessel 10. As an example for a reactor vessel 10 having an internal volume from about 35 $cm^3$ to about 40 $cm^3$ and an average residence time for the water of about 20 to 55 minutes, a single ultraviolet LED within the reactor is likely to be sufficient.

As noted, the LEDs 26 emit light in the ultraviolet frequency spectrum. Preferably, the LEDs 26 each emit ultraviolet light having a wavelength from about 240 nm to about 390 nm.

The ultraviolet light from LEDs 26 may be used to destroy both chemical and biological contaminants of concern in the water being treated. For instance, the ultraviolet LEDs 26 may be used to destroy one or more contaminants selected from the group consisting of bacteria, protozoa, herbicides, insecticides, pharmaceuticals, personal care products, fuels, solvents, food additives, ammunition propellants, explosives and combinations thereof. In particular, the ultraviolet LEDs 26 may be advantageously used to destroy biological contaminants such as coliform bacteria (e.g., *E. coli*) and *Giardia* protozoa.

To further facilitate destruction of the contaminants using the ultraviolet LEDs 26, the reactor system also includes a plurality of photo-catalyst substrates 28 disposed within the internal reactor volume 24 of the reactor vessel 10. Each of these photo-catalyst substrates 28 includes a coating 34 of titanium dioxide applied to an outer substrate surface 32. The titanium dioxide coating 34 is photo-catalytically active and promotes the generation of hydroxyl radicals, from water molecules. These hydroxyl radicals in turn act in conjunction with the ultraviolet light to destroy at least a portion of the organic and/or biological contaminants.

Figure 2A:
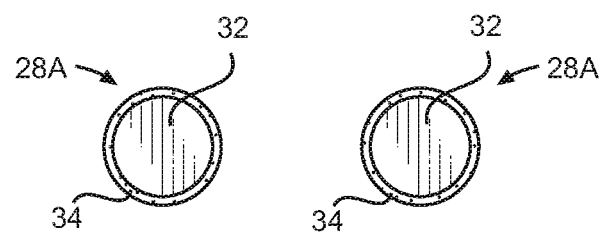
FIGS. 2A-2C are elevational views of various titanium dioxide-coated substrates for use as photo-catalysts according to certain embodiments of the present disclosure.
Figure 2B:
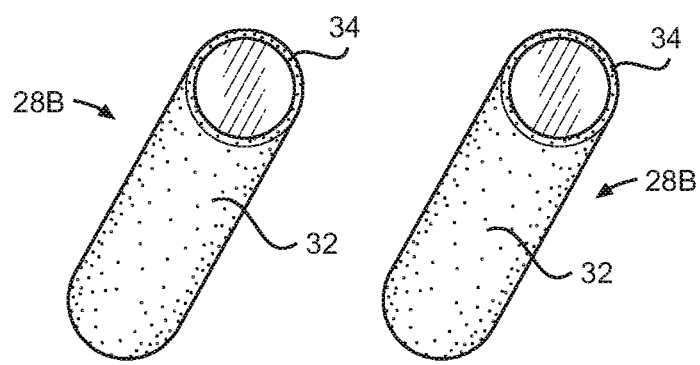

The substrate 28 is generally formed from a material which is substantially inert, such as a borosilicate or quartz glass material. In some instances, the substrate 28 may take the form of a bead 28a or a cylinder 28b, in some instances a hollow cylinder, as shown in FIGS. 2A and 2B. For instance, the substrate 28 may be a borosilicate bead or a quartz cylinder. In such cases, a plurality of the photo-catalyst substrates 28 may be packed into the interior volume 24 of the reactor to provide a randomly packed column. When using such randomly packed substrates 28, it is generally preferred that the packed substrates fill as much of the interior volume of the reactor vessel 10 as possible, preferably more than 90 percent of interior volume.

Figure 2C:
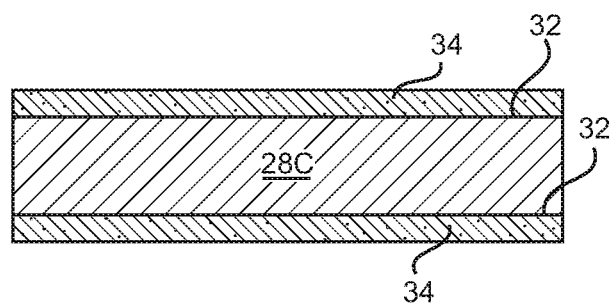

In other instances, the substrate 28 may be provided by a flat plate 28c of borosilicate or quartz glass material, as shown in FIG. 2C. For instance, a borosilicate glass slide might be used as a substrate 28c. In such cases, a plurality of the substrates 28c are preferably positioned within the interior volume 24 of the reactor in a structured, rather than random, manner. In other words, the substrates 28c are positioned in a fixed and organized manner so that amount of photo-catalyst covered substrate water contacts as it flows through the reactor 10 remains more consistent. The use of a fixed substrate such as the slide 28c may also make it easier to control the degree of turbulence present in the reactor 10. Preferably, one or more slots are formed on the interior surfaces of the reactor vessel 10. The edges of the flat plate 28c are positioned within these slots, which guide and hold the substrates 28c in a desired position within the reactor 10.

A coating 34 of titanium dioxide is applied to an outer substrate surface 32. It is this titanium dioxide coating 34 which is the catalytically active portion of the photo-catalyst substrate 28. The amount of titanium dioxide on the outer surface 32 of the substrate may vary, but preferably, the outer surface 32 of the substrate 28 is coated with titanium dioxide in an amount from about 0.02 $mg/cm^2$ to about 0.20 $mg/cm^2$.

Titanium dioxide exists in multiple crystalline forms (polymorphs). The most common are the anatase form and the rutile form. In a preferred embodiment of the present disclosure, the titanium dioxide in the coating 34 is in the anatase crystalline form. Without being bound by theory, the anatase form of titanium dioxide is believed to have a greater photocatalytic activity, i.e., the anatase form provides greater hydroxy radical formation that the rutile form.

Figure 3:
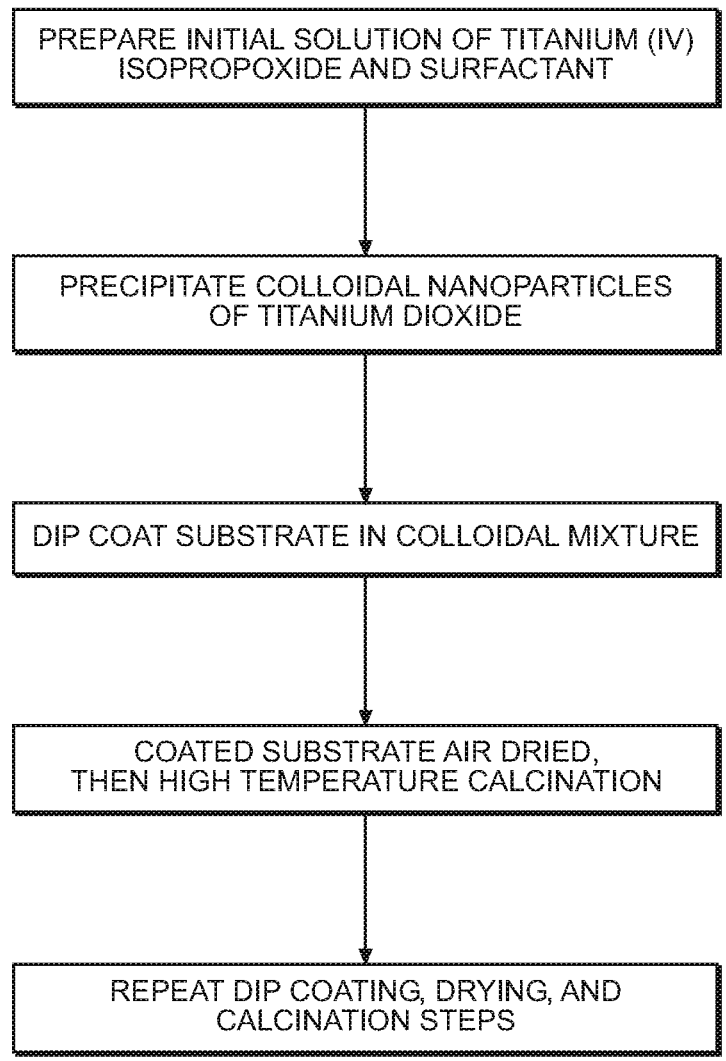
FIG. 3 is a flow diagram illustrating a method for preparing a titanium dioxide-coated substrate according to one embodiment of the present disclosure.

In general, the titanium dioxide coating 34 is preferably applied to the outer surface 32 of the photo-catalyst substrate 28 using a sol-gel process. According to this process, nanoparticles of titanium dioxide are precipitated from an initial solution of a titanium alkoxide (such as titanium (IV) isopropoxide) and a surfactant dissolved in an organic solvent. A colloidal mixture of titanium dioxide is thus formed. This colloidal mixture is used to dip coat the substrate 28. As the coating 34 applied in this manner dries, first a gel and then a thin film of titanium dioxide is formed on the outer surfaces 32 of the substrate 28. The coated substrate 28 may then be heated at a controlled heating rate in a furnace, up to about 500° C., to further dry the coating 34 and to adhere the titanium dioxide nanoparticles to the outer surfaces 32 of the substrate 28. This sol-gel dip coating process may be repeated several times to provide a heavier coating of the titanium dioxide photocatalyst. This process is summarized in the flow diagram of FIG. 3.

Typically, a pump is also provided in flow communication with the reactor vessel inlet 20 in order to move the water into and out of the reactor vessel 10 for treatment. In this regard, the contaminated water may be treated in the reactor vessel 10 either continuously or on a batch basis. Preferably, contaminated water is treated in a reactor vessel 10 on a continuous flow basis, and the pump is sized in proportion to the overall size of the reactor vessel 10. Preferably, the water flow rate in and out of the reactor vessel 10 is varied so that the water in the internal reactor volume 24 has an average residence time from about 20 minutes to about 55 minutes.

By controlling both the average residence time of the water in the reactor vessel 10 and the number and power of the LEDs used in the reactor vessel 10, the amount of ultraviolet light which the contaminated water is subjected to may also be controlled. This may be characterized in terms of a light fluence rate. Preferably, according to the present disclosure, water within the internal reactor volume 24 is subjected to ultraviolet radiation from the ultraviolet LED(s) at a fluence rate of at least 0.03 Joules per liter per second. In some instances, the fluence rate may be from about 0.03 Joules per liter per second to about 0.13 Joules per liter per second. For a reactor vessel 10 having an internal volume from about 35 cm$^3$ to about 40 cm$^3$ and an average residence time for the water of about 21 minutes, this fluence rate may be achieved with a single ultraviolet LED.

The present disclosure also provides a method for remediating contaminated water, using a remediation reactor system as described above. For instance, the method of the present disclosure may be used to treat water which includes one or more contaminants selected from the group consisting of bacteria, protozoa, herbicides, insecticides, pharmaceuticals, personal care products, fuels, solvents, food additives, ammunition propellants, explosives and combinations thereof. The method may in particular be used to treat water which has been contaminated with either coliform bacteria and/or *Giardia* protozoa.

According to the method of the present disclosure, remediation reactor system as described above is provided. Water which includes organic and/or biological contaminants is introduced into the internal reactor volume 24 through the water inlet 20. The contaminated water within the internal reactor volume 24 is then subjected to ultraviolet radiation from the at least one ultraviolet LED 26 (and hydroxyl radicals generated through photo-catalysis of the titanium dioxide coated substrate) so as to destroy at least a portion of the organic and/or biological contaminants. After being subjected to the ultraviolet radiation, the water is then removed from the internal reactor volume 24.

According to the method of the present disclosure, the contaminated water may be treated in the reactor vessel 10 on either a batch-wise or a continuous flow basis. Preferably, contaminated water is treated in a reactor vessel 10 on a continuous flow basis. When treated on a continuous flow basis, the flow rate of the water in and out of the reactor vessel 10 may be varied in accordance with the overall size of the reactor vessel 10. Preferably, the water flow rate in and out of the reactor vessel 10 is varied so that the water in the internal reactor volume 24 has an average residence time from about 20 minutes to about 55 minutes.

Following treatment in the reactor vessel 10, preferably at least 50% of the contaminants in the water are destroyed by the ultraviolet radiation within the internal reactor volume 24. In some embodiments of the invention, at least 90% of the contaminants in the water are preferably destroyed by the ultraviolet radiation within the internal reactor volume 24. In some embodiments of the invention, at least 99% of the contaminants in the water are preferably destroyed by the ultraviolet radiation within the internal reactor volume 24. The degree of contaminant destruction will vary depending upon both the type of contaminant and the initial concentration of the contaminant. In certain embodiments of the present disclosure (but not all), the water removed from the internal reactor volume 24 is sufficiently decontaminated to be potable, that is, suitable for human consumption without further treatment.

In some instances, larger volumes of contaminated water may be treated in accordance with the method of the present disclosure by utilizing a plurality of reactor vessels 10 in parallel with one another. In such cases, a plurality of remediation reactor systems as described above are provide and the aforementioned treatment steps are carried out in each of the remediation reactor systems.

EXAMPLES

Example 1

In one example, titanium dioxide (TiO$_2$) thin films were prepared using borosilicate beads, quartz cylinders and standard microscope slides as substrates. The solid borosilicate glass beads (from Sigma-Aldrich, St. Louis, Mo.) measured 6 mm in diameter with ±10% variation in bead size. The quartz cylinders were custom cut and obtained from Quality Quartz Engineering (Dayton, Ohio). Each solid quartz cylinder precisely measured 0.635 cm×0.476 cm. The standard microscope slides (from Ted Pella of Redding, Calif.) were made of quartz and borosilicate, measuring 7.62 cm×2.54 cm×0.15875 cm.

A modified version of a sol-gel procedure was used to immobilize TiO$_2$ to the substrates. Before the coating procedure began, the substrate was thoroughly rinsed with a 50:50 ethanol and water solution, then vigorously shaken and rinsed with pure deionized water. Each substrate was then heat-treated at 500° C. for 20 min in order to remove any organic contaminants and particulates. Each substrate was weighed before and after to determine the amount of TiO$_2$ immobilized on each substrate. Sol-gel was prepared in duplicate by combing five grams of Tween 80 (Sigma-Aldrich) and 40.15 mL of 2-Propanol (Fisher Scientific) in a 50-mL centrifuge tube. After adding small stir bars, the solutions were capped tightly and slowly inverted two times to ensure a homogenous mixture without bubbles. Each solution was stirred for 10 minutes at 350 rpm. While continuously stirring, 0.67 mL of acetic acid (Sigma-Aldrich) and 3.4 mL of 99.999% titanium (IV) isopropoxide (Sigma-Aldrich) were added. Solutions were again inverted two times then set to stir for 20 min. Solutions appeared viscous and clear of a pale yellow to brownish color. A small hole was punctured in the bottom of three other centrifuge tubes containing the beads, slides, and cylinders. The sol-gel solution was poured into the tube, which dip coated the substrate at a rate of 1 mL·s$^{-1}$ while collecting and retaining the original solution. The substrate was then placed into a crucible and allowed to air dry for about 10 minutes. A furnace (Paragon Sentry 2.0; Mesquite, Tex.) was programmed to anneal the substrates starting at 100° C. and ramping up to 500° C., and to hold this temperature for about 20 minutes. Slides were then cooled at room temperature, which represented the completion of a one-dip cycle. The process was repeated until the desired dip count was reached. Due to the extended period of heat cycling and cooling, the solution turned into a pale milky color by the end of the procedure. Each dip-coated substrate was wrapped in foil and placed in a 50-mL centrifuge tube, then stored at room temperature to mitigate potential surface organic contamination or photooxidation reactions.

Examples 2-4

In these examples, a bench scale reactor system was prepared in accordance with present disclosure. The reactor vessel was formed from a length of pipe made from polytetrafluoroethylene (PTFE) end caps on either end of the pipe made from the same material. The interior surfaces of the end caps were hemispherical in shape. The PTFE pipe had an internal diameter of about 2.2 cm and a length of about 8.05 cm.

One ultraviolet (255 nm) LED light was attached to the interior surfaces of each of the reactor end caps. A small copper heat sink was also attached adjacent to each LED to assist in heat dissipation. There were two parts to the heat sink, a copper plug and a copper cap with fins. A thin layer of thermal paste was applied between the copper plug and heat sink. The copper plug assisted in dissipating heat from the LED into the heat sink. Electrical leads from the LEDs were soldered and wired in series to a circuit board containing constant current resistors and connected to a DC power supply. The circuit board was then connected in series to the two LEDs installed in the reactor end caps to provide power. The power supply delivered 23.5 V at 200 mA to the circuit board. The resistors ensured an average input power of 1.2 watts to the LEDs.

Each end cap also included a port for water flow into or out of the reactor. The ports were each connected to L/S 14 silicone laboratory tubing. The tubing attached to the bottom (inlet) port was positioned through a peristaltic pump in order to flow water through the pump.

A ring stand was used to position the reactor vertically and ensure the wiring and tubing were free from obstruction. The interior volume of the reactor was about 90 percent filled with photocatalyst substrates (borosilicate beads, cylinders, or slides) which (aside from control tests) were coated with titanium dioxide as described in Example 1.

Water with organic contaminants of concern was simulated by adding organic food colorants (either Allura Red AC or Brilliant Blue FCF) to a beaker of water. This colorant contaminated water was then pumped into the reactor at a flow rate of from about 1.5 to about 1.73 mL per minute and subjected to ultraviolet radiation in the reactor. As the water exited the top of the reactor, it was returned to the original beaker using the tubing connected to the top end cap. From the beaker, the water could then be pumped back into the reactor again. Thus, the colorant contaminated water was effectively recirculated through the reactor multiple times.

Periodically, the water in the beaker was sampled and analyzed using a UV-Vis spectrophotometer to determine the concentration of the colorant in the water and measure the decrease in concentration over time.

Example 2

In Example 2, the reactor was tested using Allura Red dye as the simulated organic contaminant. The reactor was tested using bead, cylinder, and slide substrates. In each instance, the substrates were coated with titanium dioxide as discussed above. For comparison, the reactor was tested both with the LEDs on and with the LEDs off. The water from the reactor was sampled every 24 minutes, and the concentration of the Allura Red was measuring using UV-Vis spectrophotometer. These Allura Red concentration results are summarized in the following Table:

| Time (min) | Beads (#1) LED off C (mg/L) | Beads (#1) LED on C (mg/L) | Beads (#2) LED off C (mg/L) | Beads (#2) LED on C (mg/L) |
|---|---|---|---|---|
| 1 | 4.14 | 5.01 | 4.84 | 5.54 |
| 24 | 3.88 | 4.59 | 4.80 | 5.21 |
| 48 | 4.06 | 4.30 | 4.88 | 4.82 |
| 72 | 4.23 | 4.04 | 4.99 | 4.51 |
| 96 | 4.35 | 3.78 | 5.09 | 4.22 |
| 120 | 4.51 | 3.50 | 5.18 | 3.93 |
| 144 | 4.63 | 3.23 | 5.27 | 3.63 |
| 168 | 4.73 | 2.99 | 5.35 | 3.37 |
| 192 | 4.84 | 2.76 | 5.41 | 3.11 |
| 216 | 4.93 | 2.55 | 5.46 | 2.87 |
| 240 | 5.02 | 2.35 | 5.51 | 2.63 |

| Time (min) | Cylinders LED off C (mg/L) | Cylinders LED on C (mg/L) | Slide LED off C (mg/L) | Slide LED on C (mg/L) |
|---|---|---|---|---|
| 1 | 4.37 | 4.42 | 4.89 | 4.81 |
| 24 | 3.81 | 4.09 | 4.79 | 4.70 |
| 48 | 3.84 | 3.82 | 4.77 | 4.64 |
| 72 | 3.92 | 3.59 | 4.77 | 4.55 |
| 96 | 4.03 | 3.33 | 4.75 | 4.39 |
| 120 | 4.09 | 3.10 | 4.75 | 4.20 |
| 144 | 4.16 | 2.88 | 4.75 | 4.08 |
| 168 | 4.22 | 2.66 | 4.76 | 3.99 |
| 192 | 4.29 | 2.46 | 4.77 | 3.85 |
| 216 | 4.36 | 2.26 | 4.78 | 3.74 |
| 240 | 4.42 | No data | 4.81 | No data |

From this data, the ratio of the final contaminant concentration to the original contaminant concentration, $C/C_{(0)}$, may also be computed. The ratios are as follows:

| Final $C/C_{(0)}$ | | | |
|---|---|---|---|
| Beads (#1) LED off C (mg/L) | Beads (#1) LED on C (mg/L) | Beads (#2) LED off C (mg/L) | Beads (#2) LED on C (mg/L) |
| 1.21 | 0.47 | 1.14 | 0.48 |

| Final $C/C_{(0)}$ | | | |
|---|---|---|---|
| Cylinders LED off C (mg/L) | Cylinders LED on C (mg/L) | Slide LED off C (mg/L) | Slide LED on C (mg/L) |
| 1.01 | 0.51 | 0.98 | 0.78 |

Again, in each instance, the substrate was coated with titanium dioxide. The variable was the application of ultraviolet light from the LED, or the lack there of. These results demonstrate that the use of titanium dioxide-coated substrates without ultraviolet light was not effective in reducing the organic contaminant concentrations. However, when the titanium dioxide-coated substrates were used together with ultraviolet light from the LED, the result was highly effective in reducing organic contaminant concentrations.

Example 3

In Example 3, the rector was again tested using Allura Red dye as the simulated organic contaminant. The reactor was tested using bead, cylinder, and slide substrates. In some instances, the substrates were coated with titanium dioxide as discussed above. In other instances, the substrates were not coated. In each case, the ultraviolet LED in the reactor was turned on. The test results are summarized in the following Table:

| Time (min) | Empty Reactor C (mg/L) | Untreated Beads C (mg/L) | Treated Beads C (mg/L) | Untreated Cylinder C (mg/L) | Treated Cylinders C (mg/L) | Untreated Slide C (mg/L) | Treated Slide C (mg/L) |
| --- | --- | --- | --- | --- | --- | --- | --- |
| 1 | 5.05 | 5.00 | 5.03 | 5.11 | 5.01 | 4.90 | 4.97 |
| 30 | 5.00 | 4.99 | 4.55 | 5.02 | 4.69 | 4.89 | 4.72 |
| 60 | 4.98 | 4.98 | 4.12 | 4.98 | 4.35 | 4.86 | 4.53 |
| 90 | 4.96 | 4.97 | 3.73 | 4.95 | 3.99 | 4.81 | 4.39 |
| 120 | 4.93 | 4.95 | 3.36 | 4.90 | 3.66 | 4.76 | 4.24 |
| 150 | 4.92 | 4.93 | 3.01 | 4.87 | 3.33 | 4.73 | 4.07 |
| 180 | 4.89 | 4.91 | 2.70 | 4.84 | 3.03 | 4.69 | 3.91 |
| 210 | 4.88 | 4.90 | 2.39 | 4.80 | 2.75 | 4.65 | 3.76 |
| 240 | 4.86 | 4.88 | 2.12 | 4.77 | 2.48 | 4.61 | 3.61 |

The ratio of the final containment concentration to the original contaminant concentration, $C/C_{(0)}$, was also computed. The ratios are as follows:

| Empty Reactor | Untreated Beads | Treated Beads | Untreated Cylinder | Treated Cylinders | Untreated Slide | Treated Slide |
| --- | --- | --- | --- | --- | --- | --- |
| 0.96 | 0.98 | 0.42 | 0.93 | 0.495 | 0.94 | 0.73 |

These results demonstrate that the use of ultraviolet light without titanium dioxide-coated substrates was not effective in reducing the organic contaminant concentrations. However, when the titanium dioxide-coated substrates were used together with ultraviolet light from the LED, the result was again highly effective in reducing organic contaminant concentrations.

Example 4

In Example 4, the reactor was tested using Brilliant Blue dye as the simulated organic contaminant. As in Example 2, the reactor was tested using bead, cylinder, and slide substrates. All of the substrates were coated with titanium dioxide as discussed above. For comparison, the reactor was tested both with the LEDs on and with the LEDs off. The test results are summarized in the following Table:

| Time (min) | Beads LED off C (mg/L) | Slide LED on C (mg/L) | Slide LED off C (mg/L) | Beads LED on C (mg/L) |
| --- | --- | --- | --- | --- |
| 1 | 4.45 | 4.83 | 4.62 | 4.70 |
| 24 | 4.58 | 4.54 | 4.66 | 4.59 |
| 48 | 4.68 | 4.24 | 4.66 | 4.44 |
| 72 | 4.72 | 3.99 | 4.67 | 4.33 |
| 96 | 4.73 | 3.75 | 4.66 | 4.12 |
| 120 | 4.75 | 3.51 | 4.68 | 3.99 |
| 144 | 4.78 | 3.28 | 4.68 | 3.83 |
| 168 | 4.80 | 3.07 | 4.68 | 3.68 |
| 192 | 4.81 | 2.86 | 4.69 | 3.56 |
| 216 | 4.82 | 2.68 | 4.71 | 3.43 |
| 240 | No data | 2.52 | 4.70 | 3.30 |

| Time (min) | Cylinders LED off C (mg/L) | Cylinders LED on (#1) C (mg/L) | Cylinders LED on (#2) C (mg/L) |
| --- | --- | --- | --- |
| 1 | 4.53 | 4.78 | 4.70 |
| 24 | 4.62 | 4.49 | 4.41 |
| 48 | 4.66 | 4.22 | 4.14 |
| 72 | 4.68 | 3.91 | 3.85 |
| 96 | 4.71 | 3.68 | 3.63 |
| 120 | 4.71 | 3.62 | 3.40 |
| 144 | 4.74 | 3.54 | 3.21 |
| 168 | 4.75 | 3.47 | 3.02 |
| 192 | 4.76 | 3.39 | 2.83 |
| 216 | 4.75 | 3.31 | 2.66 |
| 240 | 4.77 | 3.23 | 2.48 |

The ratio of the final contaminant concentration to the original contaminant concentration, $C/C_{(0)}$, was also computed. The ratios are as follows:

| Final $C/C_{(0)}$ | | | |
| --- | --- | --- | --- |
| Beads LED off C (mg/L) | Beads LED on C (mg/L) | Slide LED off C (mg/L) | Slide LED on C (mg/L) |
| 1.08 | 0.52 | 1.02 | 0.70 |

| Final $C/C_{(0)}$ | | |
| --- | --- | --- |
| Cylinders LED off C (mg/L) | Cylinders LED on (#1) C (mg/L) | Cylinders LED on (#2) C (mg/L) |
| 1.05 | 0.68 | 0.53 |

These results are similar to those of Example 2, only using a different contaminant dye. Here again, the results demonstrate that the use of titanium dioxide-coated substrates without ultraviolet light was not effective in reducing the organic contaminant concentrations. However, when the titanium dioxide-coated substrates were used together with ultraviolet light from the LED, the result was highly effective in reducing organic contaminant concentrations.

As used herein and in the appended claims, the singular forms "a", "an" and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative compositions, and methods and illustrative examples shown and described. Accordingly, departures may be made from such details without departing from the scope or the spirit of the general inventive concept exemplified herein.

What is claimed is:

1. A reactor system for treating contaminated water, comprising:
   a reactor vessel having a first and second end portions and an internal reactor volume defined by interior surfaces of the reactor vessel;
   a polytetrafluoroethylene coating applied over at least a portion of the interior surfaces of the reactor vessel;
   a water inlet disposed in the first end portion and a water outlet disposed in the second end portion;
   at least one ultraviolet light-emitting diode (LED) disposed so as to project ultraviolet light into the reactor vessel; and
   a plurality of photo-catalyst substrates disposed within the internal reactor volume of the reactor vessel, each of the substrates having a coating of anatase crystalline titanium dioxide applied to an outer surface of the substrate, wherein the outer surface of the substrate is coated with anatase crystalline titanium dioxide in an amount from about 0.02 mg/cm2 to about 0.20 mg/cm2.

2. The reactor system of claim 1, wherein each of the photo-catalyst substrates comprises a borosilicate or quartz material.

3. The reactor system of claim 1, wherein water within the internal reactor volume is subjected to ultraviolet radiation from the at least one ultraviolet LED at a fluence rate of at least 0.03 Joules per liter per second.

* * * * *